W. O. JOHNSON.
CARD RECORD AND FILE.
APPLICATION FILED DEC. 28, 1904.
907,244.
Patented Dec. 22, 1908.
2 SHEETS—SHEET 2.
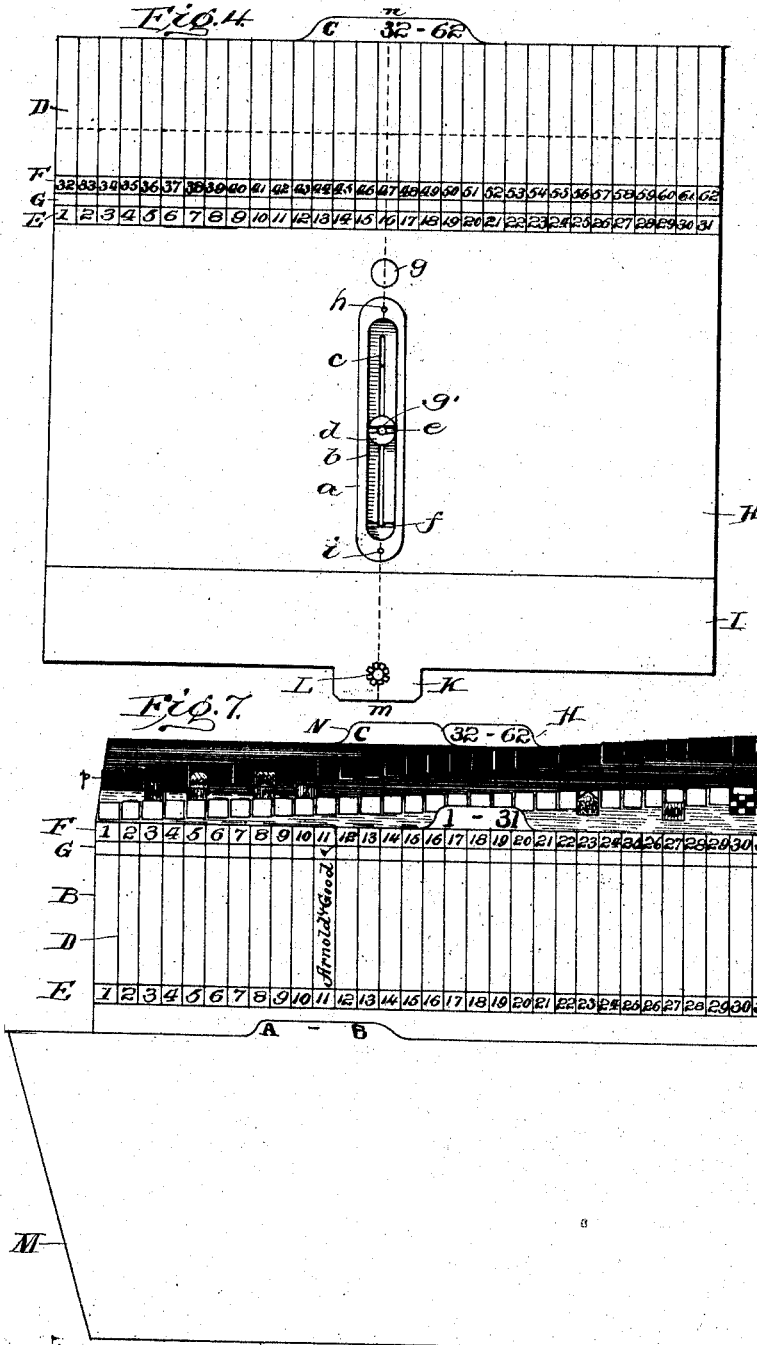
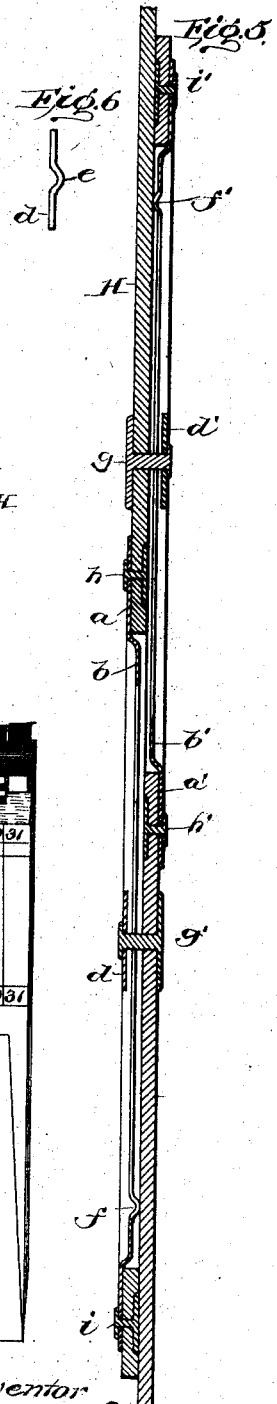

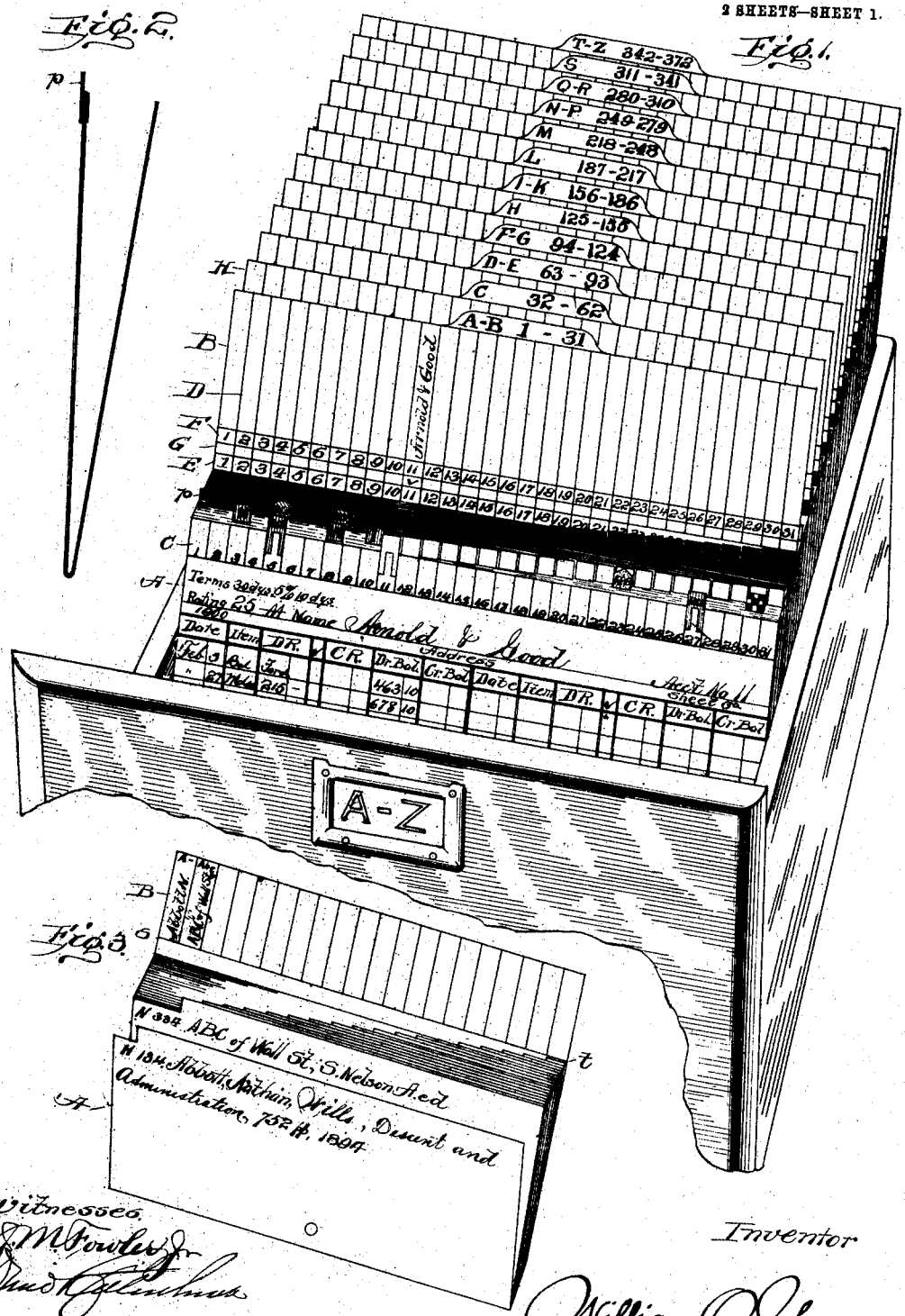

UNITED STATES PATENT OFFICE.

WILLIAM O. JOHNSON, OF WASHINGTON, DISTRICT OF COLUMBIA.

CARD RECORD AND FILE.

No. 907,244.     Specification of Letters Patent.     Patented Dec. 22, 1908.

Application filed December 28, 1904. Serial No. 238,677.

*To all whom it may concern:*

Be it known that I, WILLIAM O. JOHNSON, of Washington, in the District of Columbia, have invented new and useful Improvements in Card Records and Files, of which the following is a specification.

My invention relates to those classes of devices known as card indexes, card ledgers and letter or document files.

The objects of the invention are, 1, to provide an index whereby any account or division of the file may be easily and quickly found; 2, to provide a simple method of marking any account or division of the file so that accounts or divisions where changes have been made may be easily distinguished from the others; and, 3, to provide a simple way of distinguishing several different classifications of each account or division of the file at the same time.

In the accompanying drawings, forming a part of this specification, the same characters of reference indicate corresponding parts in each of the views.

Figure 1 shows a drawer supplied with a card record and file illustrating a general form of the invention. Fig. 2 shows an edge view of one of the folders of the file removed from the drawer. Fig. 3 shows one way of applying the indexing features to card catalogues for libraries and the like. Fig. 4 shows one of the index sheets of Fig. 1 removed from the drawer. Fig. 5 shows an enlarged sectional view of Fig. 4. Fig. 6 shows a detached portion of Fig. 5, and Fig. 7 shows a modification of the indexing features seen in Fig. 1.

In Fig. 1 the record sheets, A, each having a white tab, and the folders, each having a black tab, are divided into groups by index sheets, B, H, etc. with 31 record sheets and 31 folders in each group. The first ten record sheets have been turned over out of sight behind the front end of the drawer. Each record sheet is provided with a column, C, near the top, divided into 31 parts which are numbered consecutively. The index sheets are provided with a column, D, for names, a column F, for the numbers of the accounts, a column, G, for check marks, and an extra number column, E. Each of the columns is divided into parts to correspond with the divisions of column C on the record sheets. Column C and the columns on the index sheets may be divided into any number of parts and the number of record sheets or folders between any two index sheets will correspond with the number of such divisions. The parts of column E are marked or numbered the same on each index sheet and the markings correspond with those in column C on the record sheets. Being duplicates of each other either column may be dispensed with if desired. The parts of column F are numbered from 1 to 31 on the first index sheet, 32 to 62 on the second and so forth as shown by the inclusive numbers on the tab of each index sheet. Whenever an account is opened the name of the account is written in its proper alphabetical position on one of the index sheets and the number opposite the name in column F is written in the space designated "Acc't No." on the record sheet; a white index tab is then placed over the number in column C corresponding to the number in column E that is in line with the name of the account on the index. The white tab on each record sheet is thus in line with the space in which the record sheet is indexed on the index sheet. The main part of each record sheet may be ruled in any manner to suit the purpose for which they are to be used. When a record sheet is full another will be substituted and the filled one may be removed and placed in its alphabetical position in a transfer file so that the past record of any account may be readily referred to at any time.

Each folder is made of a piece of paper twice the size of each record sheet and is folded at the bottom and open at the top. Envelops are equivalent to folders and may be substituted for them. On the front side of each folder, near the top edge, is a number column similar to column C on the record sheets and also spaces for the name and number of the folder. Black tabs are used for indexing the folders so as to distinguish them from the record sheets. A black tab is placed over the front edge of each folder and in line with the corresponding name and number on the index. Any record sheet or folder may be instantly found by means of the white or black index tab in line with the name and number on the index. Any kind of tab of any color may be used either on the record sheets or folders. Fig. 2 shows an edge view of one of the folders removed from the drawer. The black index tab is seen on the upper edge of the front side.

Each folder is a receptacle in which is to be filed the letters and other papers in connection with each account.

Fig. 4 shows the index, H, Fig. 1, removed from the drawer. Each index sheet is attached to a guide board, I, having on the lower edge a tab, K, provided with an eyelet, L. The tab K fits into a longitudinal groove in the bottom of the drawer. A rod in this groove and running parallel with it is passed through the eyelet L and serves to keep the guide boards in place. Each index sheet is attached to its complementary guide board by means of rivets, $g$ and $g'$. The metal plate $a$ is fastened to index sheet H by means of rivets, $h$ and $i$. An opening is cut in the index sheet, H, into which the shaded portion $b$ of the plate $a$ is depressed. This forms a hollow in plate $a$ in which the washer $d$ is made to slide. The rivet $g$ has a like washer on the opposite end which is made to slide in a like metal plate riveted to the opposite side of the guide board, I. The plate $a$ has a horizontal groove, $f$, and the washer, $d$, has a horizontal lug, $e$, on the inner side. When the index sheet, H, is raised until the rivet $g'$ gets to the lower end of the groove $c$ the lug $e$ of the washer $d$ will by means of the spring in the washer $d$ and the plate $a$ drop into the groove $f$ and hold the index sheet in its raised position. Each index sheet exclusive of the tab is made the same size as the record sheets and when not in use may be lowered so that only the letters and numbers on the tab appear above the record sheets.

Fig. 5 shows an exaggerated sectional view of Fig. 4 as seen on the line $m$, $n$. It is described by referring to the corresponding letters of reference in Fig. 4.

Fig. 6 is an enlarged edge view of the washer $d$ removed from the rivet $g'$ and shows the lug $e$ which does not appear in the sectional view. The index sheet may be attached to the guide board by means of the rivets, $g$ and $g'$, or similar means, without the use of the metal plates. In this case the groove $c$ will be cut in the index sheet, H, and a similar groove in the guide board, I, in which the rivet $g$ may slide. The index sheet and guide board may be fastened together by means of any kind of device which will permit the index sheet to be raised and lowered. Each index sheet may be made in one solid piece a few inches higher than the record sheets so that columns E, G, F and D will appear above the edges of the record sheets, and the lower edge of the index sheet may or may not have a tab and eyelet similar to those on guide board I in Fig. 4.

Fig. 7 shows a modified form of the invention wherein the index sheets, exclusive of the tabs, are the same height as the record sheets and each index sheet is placed in front of the group of record sheets and folders indexed thereon. Record sheet No. 11 and folder No. 11, or any record sheet and folder, may be found by means of the white and black tab in line with and behind the name and number on the index. Instead of placing the inclusive letters on the tabs of the index sheets they may be placed on separate sheets or guide boards, M and N, which is equivalent to placing them on the index sheets. Any index sheet may be exposed by means of the tab on the preceding guide board. Fig. 7 shows only the first group of record sheets and folders with their preceding guide board and index sheet, and the guide board N with the index sheet H behind which the second group of record sheets and folders are to be placed and so on, one group of record sheets and folders behind each guide board and index sheet. Each of the guide boards and index sheets may be made with a tab and eyelet on the lower edge.

A pencil check mark may be entered in column G, Figs. 1 and 7, whenever an item is posted to the corresponding account, and erased after a trial balance has been taken or at any time. By reference to the check marks each successive account where an entry has been made since the last proof may be instantly referred to without taking any notice of any others.

Colored tabs, seen in Figs. 1 and 7, are used to classify accounts and folders or mark those requiring attention at some particular future time. Red tabs are distinguished by perpendicular shading, yellow tabs by oblique shading and blue tabs by dotted shading. Red tabs are used to indicate the day on which the account to which it is attached becomes due. Yellow tabs denote accounts that have been drawn on through some bank and are used to mark the time within which returns should be received. Blue tabs mark accounts that are in the hands of an attorney and indicate the time within which report should be received. Thus, in Fig. 1 is seen two red tabs attached to record sheet No. 11; one in the 5th row and one in the 27th row, each marked "Mch.", indicating that this firm has bills that are due on Mch. 5th and Mch. 27th. An account that requires attention at some future date is marked by placing a tab with the required month designated thereon over the number in column C of the record sheet corresponding to the day of the month on which attention is to be called to it. On Mch. 5th two accounts will require attention as indicated by the two colored tabs in the 5th row. The red tab denotes that this account is due and the yellow tab denotes that this account has been drawn on, presumably on Feb. 28th, and if no returns are received before Mch. 5th the bank should be notified to make returns or give reasons for non-payment and the yellow tab moved five spaces to the right so as to call attention to the account again on Mch. 10th. On Mch.

8th two colored tabs will be found in the 8th row. No attention is paid to the first because the designation "Apr." thereon indicates that this account requires attention on Apr. 8th. In the 10th row is seen a red tab "I" indicating that this account is due in monthly installments on the 10th of each month. In the 3'd row attached to the same record sheet is seen a red tab "N" calling attention to the mailing of a notice a week before each installment is due. When the last notice is mailed the "N" tab is removed and when the last installment is paid the "I" tab is removed. In the 23d row is seen a blue tab marked "Feb." which indicates that this account has been placed in the hands of an attorney and should be reported by him before Feb. 23d. In the 30th row is seen a checkered tab which indicates that this is a suspense account. When an account is settled the colored tab is removed. Different shapes of the tabs may be used to indicate different ratings. Thus, in the 23d row is seen a pointed tab indicating that this party is rated below $5,000. In the 5th row is seen one square tab and one round tab. The round tab indicates a rating of $5,000 to $20,000, and the square tab indicates a rating of $20,000 or more. The folders are classified in the same manner by the use of tabs in different positions with different colors, markings and shapes. In classifying the folders one color may be used by each department of a business concern. Thus, if the red tabs are used exclusively by the salesmanager, the yellow tabs by the purchasing agent, the blue tabs by the advertising department and so forth, all folders having tabs of the same color with the current month designated thereon and in the row corresponding to the day of the month may be easily distinguished, removed and taken to the proper department for attention at the required time. Each group of record sheets or folders is indexed and classified in the same manner.

It is not my intention to limit the claims to the uses described. There may be more or less than 31 rows, different colors or combinations of colors and different shapes may be substituted or added and any kind of markings may be used. Any number of different positions, colors, markings or shapes of the tabs may be used to indicate any arbitrary classifications. Different drawers or trays may be used for generic classification; the contents of each drawer may be divided into groups by index sheets or guide boards. Each group may be further divided by having tabs in different positions; further classification may be accomplished by the use of tabs of different colors; another classification may be indicated by different markings on the tabs; and still further classification may be made by using tabs of different shapes. The system will be useful wherever it is desirable to make a large number of coördinate, subordinate or mixed classifications at the same time.

The record sheets and folders may each be classified or indexed separately in different parts of the same drawer or in different drawers, in which case they may be different in size. If desired, folder No. 1 may be placed immediately in front of or behind record sheet No. 1; then record sheet No. 2 and folder No. 2 and so forth. Sheets like the record sheets or the record sheets themselves may be used as divisions of the file and the letters and other papers in connection with any account placed immediately behind the record sheet of the account. When so used the record sheets are equivalent to folders or envelops. The tab is made of a piece of metal having one end cut into three prongs or tongues for grasping the leaf. Any kind of tab may be used. When used as a file the folders or division sheets of the file may lie flat and have the index sheets, index tabs and classification tabs along one side instead of along the top edge.

In Fig. 3 is seen a card index or library catalogue having projections or extensions of the record sheets instead of the index tabs seen in Figs. 1 and 7. Extensions of the edges of the record sheets and folders may be used instead of the tabs in Figs. 1 and 7; and tabs may be used instead of the extensions in Fig. 3. Each is the equivalent of the other. Fig. 3 also shows how the index may be applied to a wallet or pocket file. When used for this purpose the index sheet, B, will be made flexible along the line $s, t$ so that the index sheet or flap B may be folded over the openings of the pockets and against the side A of the wallet.

By the use of this improved system any record sheet or folder may be instantly found. Different classifications may be made of each record sheet or folder by means of differences in the position, shape, color and marking of the tabs, and without disturbing the alphabetical or numerical arrangement. All the accounts requiring attention on any day of the year and the particular condition of each may be plainly distinguished. Any account or division; all the unsettled accounts; all the open accounts not yet due; all the past due accounts; all the accounts in any particular condition; all the accounts requiring attention on any particular day of the year; all the accounts due on any day of the year; all the accounts in any particular condition that require attention on any particular day: all of these may be plainly distinguished so that each may be easily and quickly found without taking any notice of any others. Any kind of file, card index or card record may be indexed and classified at the same time so as to distinguish at a glance all the accounts or divisions in any particular class or each of the several different classifications to which any account or division belongs.

What I claim and desire to secure by Letters Patent is—

1. A card record and file having a plurality of index sheets and a plurality of record sheets forming the divisions of the file, the record sheets segregated into groups by the index sheets, each index sheet having spaces for check marks and also spaces for the names and numbers of the record sheets in one group, the record sheets provided with index tabs or projections and also adjustable classification tabs of different shapes and colors with different markings and arranged in rows transversely across the edges of the record sheets, the index tab on each record sheet so arranged opposite the spaces of the index sheets that any record sheet may be readily referred to by means thereof, substantially as set forth.

2. A card record and file having a plurality of index sheets and a plurality of record sheets and folders provided with index tabs or projections, the record sheets and folders segregated into groups by the index sheets, each index sheet having spaces for check marks and also spaces for the names and numbers of the record sheets and folders in one group, the index tab or projection on each record sheet and folder so arranged opposite the spaces of the index sheets that any record sheet or folder may be readily found by means thereof, substantially as set forth.

3. A card record and file consisting of a plurality of index sheets and a plurality of record sheets and folders provided with index tabs or projections and adjustable classification tabs of different colors with different markings and arranged in rows transversely across the edges of the record sheets and folders, the record sheets and folders segregated into groups by the index sheets, each index sheet provided with spaces for check marks and also spaces for the names and numbers of the record sheets and folders in one group, the index tab or projection on each record sheet and folder so arranged opposite the spaces of the index sheets that any record sheet or folder may be readily found by means thereof, substantially as set forth.

4. A card record and file consisting of a plurality of index sheets and a plurality of record sheets and folders provided with index tabs or projections, the record sheets and folders segregated into groups by the index sheets, each index sheet provided with a number column alongside one edge of the record sheets and folders, the index tab or projection on each record sheet and folder arranged in line with the number on the index sheet corresponding to the number on the record sheet or folder substantially as set forth.

5. A card record and file consisting of a plurality of index sheets and a plurality of record sheets and folders having index tabs or projections, the record sheets and folders segregated into groups by the index sheets, each index sheet provided with spaces for the names of the record sheets and folders in one group, and also with a space for a check mark opposite the space for each name, each record sheet and folder having an index tab or projection arranged to the right of the tab on the preceding record sheet or folder so that the tabs on the record sheets or folders form a line obliquely across the edges of the record sheets or folders in such a manner that any record sheet or folder may be readily referred to by means thereof, substantially as set forth.

6. A card record and file consisting of a plurality of index sheets and a plurality of record sheets and folders provided with index tabs or projections and adjustable classification tabs of different colors and shapes with different markings and arranged in rows, the record sheets and folders divided into groups by the index sheets, each index sheet having spaces for check marks and also spaces for the names and numbers of the record sheets and folders in one group, the index tab or projection on each record sheet or folder arranged in line with the spaces on the index designed for indexing said record sheet or folder, substantially as set forth.

7. A card record and file consisting of a plurality of index sheets and a plurality of record sheets and folders having index tabs or projections and adjustable classification tabs of different colors and shapes with different markings and arranged in rows, each record sheet and folder having near one edge a column divided into a plurality of parts marked or numbered, each index sheet having columns for names, numbers and check marks and an extra number column, all divided into a plurality of parts to correspond with the divisions of the number columns on the record sheets and folders, each space of said extra number column marked the same as the corresponding space in the number column on the record sheets and folders, the index tabs on the record sheets and folders arranged in such a manner opposite the spaces of the index sheets that any record sheet or folder may be readily found by means thereof, substantially as set forth.

8. A card record consisting of a plurality of index sheets and a plurality of record sheets having index tabs or projections and adjustable classification tabs of different colors and shapes with different markings and arranged in rows, each record sheet having near one edge a column divided into a plurality of parts marked or numbered, each index sheet having columns for names, numbers and check marks and an extra number column, each divided to correspond with the divisions of the number column on each record sheet, the parts of said extra number column marked or numbered the same as the parts of the number column on each record sheet, the index tab on each record sheet arranged opposite the space on the index sheet designed for indexing the record sheet, substantially as set forth.

9. A file consisting of a plurality of index sheets and a plurality of folders having index tabs or projections and adjustable classification tabs of different colors and shapes with different markings and arranged in rows, each folder having near one edge a column divided into a plurality of parts marked or numbered, the folders segregated into groups by the index sheets, each index sheet having columns for the names and numbers of the folders in one group, said columns divided into a plurality of parts to correspond with the divisions of the number column on each folder, the index tab or projection on each folder arranged opposite the space for indexing the folder on the index sheets, substantially as set forth.

10. A card record and file having a plurality of index sheets and a plurality of record sheets and folders provided with index tabs or projections and adjustable classification tabs of different colors with different markings and arranged in rows transversely across the edges of the record sheets and folders, the record sheets and folders segregated into groups by the index sheets, each record sheet and folder having a column near one edge divided into a plurality of parts marked or numbered, each index sheet having columns for names, numbers and check marks and an extra number column, each divided into a plurality of parts to correspond with the divisions of the column along the edge of each record sheet or folder, each space of said extra number column marked or numbered the same as the corresponding space in the column on each record sheet and folder, the index tab on each record sheet and folder arranged opposite the space for indexing the record sheet and folder on the index sheet, substantially as set forth.

11. A card record having a plurality of index sheets and a plurality of record sheets provided with index tabs or projections and adjustable classification tabs of different colors with different markings and arranged in rows transversely across the edges of the record sheets, each record sheet having near one edge a column divided into a plurality of parts marked or numbered, the record sheets segregated into groups by the index sheets, each index sheet having columns for names, numbers, check marks and an extra number column, each divided into a plurality of parts to correspond with the divisions of the column on each record sheet, each space of the extra number column marked the same as the corresponding space of the column on each record sheet, the index tab on each record sheet arranged in line with the space for indexing the record sheet on the index, substantially as set forth.

12. A file having a plurality of index sheets and a plurality of folders provided with index tabs or projections and adjustable classification tabs of different colors with different markings and arranged in rows transversely across the edges of the folders, the folders segregated into groups by the index sheets, each folder having a column near one edge and divided into parts marked or numbered, each index sheet having columns for names and numbers, each of said columns divided into a plurality of parts to correspond with the divisions of the column on each folder, the index tab on each folder arranged in line with the space designed for indexing the folder on the index, substantially as set forth.

13. A card record and file having a plurality of adjustable index sheets and a plurality of record sheets and folders provided with index tabs or projections, the record sheets and folders segregated into groups by the index sheets, each index made with a stationary portion or guide board and an adjustable portion attached to and movable in said stationary portion, the adjustable portion having spaces for indexing the record sheets and folders in one group, the index tab or projection on each record sheet and folder arranged in such a manner alongside the space on the index sheet designed for indexing the record sheet and folder that any record sheet or folder may be readily found by means thereof, substantially as set forth.

14. A card record having a plurality of adjustable index sheets and a plurality of record sheets provided with index tabs or projections, the record sheets segregated into groups by the index sheets, each index made with a stationary portion or guide board and an adjustable portion attached to and movable therein, the adjustable portion having spaces for indexing the record sheets in one group, the index tab on each record sheet arranged in line with the space on the index designed for indexing the record sheet, substantially as set forth.

15. A file having a plurality of adjustable index sheets and a plurality of folders provided with index tabs or projections, the folders segregated into groups by the index sheets, each index sheet made with a stationary portion or guide board and an adjustable portion attached to and movable therein, the adjustable portion having spaces for indexing the folders in one group, the index tab on each folder arranged in such a manner opposite the space designed for indexing the folder on the index that any folder may be readily found by means thereof, substantially as set forth.

16. A card record and file having a plurality of adjustable index sheets and a plurality of record sheets and folders provided with index tabs or projections and adjustable classification tabs of different colors with different markings and arranged in rows transversely across the edges of the record sheets and folders, the record sheets and folders segregated into groups by the index sheets, each index sheet made with a stationary part or guide board and an adjustable part attached to and movable therein, the adjustable part having spaces for indexing the record sheets and folders in one group, the index tab on each record sheet and folder arranged in line with the space for indexing the record sheet and folder on the index, substantially as set forth.

17. A card record having a plurality of adjustable index sheets and a plurality of record sheets provided with index tabs or projections and adjustable classification tabs of different colors with different markings and arranged in rows transversely across the edges of the record sheets, the record sheets segregated into groups by the index sheets, each index sheet made with a stationary portion or guide board and an adjustable portion attached to and movable therein, the adjustable portion having spaces for indexing the record sheets in one group, the index tab on each record sheet arranged in such a manner opposite the space designed for indexing the record sheet on the index that any record sheet may be readily found by means thereof, substantially as set forth.

18. A file having a plurality of adjustable index sheets and a plurality of folders provided with index tabs or projections and adjustable classification tabs of different colors with different markings and arranged in rows, the folders segregated into groups by the index sheets, each index sheet made with a stationary portion and an adjustable portion attached to and movable therein, the adjustable portion having spaces for indexing the folders in one group, the index tab on each folder so arranged with reference to the space designed for indexing the folder on the index that any folder may be readily found by means thereof, substantially as set forth.

19. A card record and file having a plurality of adjustable index sheets and a plurality of record sheets and folders, each index sheet made with a stationary portion or guide board and an adjustable portion attached to and movable therein, substantially as set forth.

20. A card record and file consisting of a plurality of index sheets and a plurality of record sheets forming the divisions of the file, the record sheets provided with index tabs or projections and segregated into groups by the index sheets, each index sheet having spaces for the names and numbers of the record sheets in one group, the index tab on each record sheet so arranged opposite the spaces of the index that any record sheet or division of the file may be readily found by means thereof, substantially as set forth.

21. A card record and file having a plurality of index sheets and a plurality of record sheets forming the divisions of the file, the record sheets segregated into groups by the index sheets, each index sheet having spaces for indexing the record sheets in one group, the record sheets provided with index tabs or projections, and adjustable classification tabs of different colors with different markings and arranged in rows transversely across the edges of the record sheets, the index tab on each record sheet so arranged opposite the spaces of the index sheets that any record sheet may be readily referred to by means thereof, substantially as set forth.

22. A file having a plurality of index sheets and a plurality of record sheets segregated into groups by the index sheets, the record sheets provided with index tabs or projections and adjustable classification tabs of different colors with different markings and arranged in rows transversely across the edges of the record sheets, each index sheet having spaces for indexing the record sheets in one group, the index tab on each record sheet so arranged opposite the spaces of the index sheet that any division of the file may be readily referred to by means thereof, substantially as set forth.

23. A card record and file consisting of a plurality of index sheets and a plurality of record sheets and folders having projections or index tabs, the record sheets and folders divided into groups by the index sheets, each index sheet having spaces thereon for indexing the record sheets and folders in one group, the index tab or projection on each record sheet or folder arranged to the right of the tab or projection on the preceding record sheet or folder so that the tabs on the record sheets or folders in the same group form a line obliquely across the edges of the record sheets or folders in such a manner that any record sheet or folder may be readily found by means thereof, substantially as set forth.

24. A card record consisting of a plurality of record sheets with tabs or projections and a plurality of index sheets, the record sheets divided into groups by the index sheets, each index sheet having spaces for indexing the record sheets in one group, the tab or projection on each record sheet arranged to the right of the tab or projection on the preceding record sheet so that the tabs or projections form a line obliquely across the edges of the record sheets in the same group in such a manner that any record sheet may be readily found by means thereof, substantially as set forth.

25. A card record and file consisting of a plurality of index sheets and a plurality of record sheets and folders having index tabs or projections and adjustable classification tabs of different colors with different markings and arranged in rows, the record sheets and folders segregated into groups by the index sheets, each index sheet having spaces for indexing the record sheets and folders in one group, the index tabs on the record sheets and folders so arranged opposite the spaces of the index sheets that any record sheet or folder may be readily found by means thereof, substantially as set forth.

26. A card record having a plurality of record sheets and a plurality of index sheets, the record sheets provided with index tabs or projections and adjustable classification tabs of different colors with different markings and arranged in rows, the index sheets segregating the record sheets into groups, each index sheet having spaces for indexing the record sheets in one group, the index tab on each record sheet arranged opposite the space devoted to the record sheet on the index sheet, substantially as set forth.

In testimony whereof I have signed my name to this specification in the presence of two subscribing witnesses.

WILLIAM O. JOHNSON.

Witnesses:
    DAVID RITTENHOUSE,
    NORMAN BESTOR.